United States Patent [19]
Young et al.

[11] 3,929,413
[45] Dec. 30, 1975

[54] FLUID TRANSPORT AND METERING SYSTEM

[75] Inventors: Robert R. Young, Anaheim; Patrick L. Randleman, Brea; Arthur B. Stolins, Newport Beach, all of Calif.

[73] Assignee: Anatronics Corporation, Anaheim, Calif.

[22] Filed: Mar. 4, 1974

[21] Appl. No.: 447,959

[52] U.S. Cl. .................. 23/259; 23/253 R; 23/230 R; 137/103; 73/425.6
[51] Int. Cl.² ............................................. G01N 1/14
[58] Field of Search ............. 23/230 R, 253 R, 259; 137/103, 565; 73/425.6

[56] References Cited
UNITED STATES PATENTS

| | | | |
|---|---|---|---|
| 2,967,764 | 1/1961 | Skeggs | 23/253 R |
| 3,334,969 | 8/1967 | Catravas | 23/253 X |
| 3,419,358 | 12/1968 | Smythe et al. | 23/253 X |
| 3,607,092 | 9/1971 | Neff et al. | 23/259 X |
| 3,645,142 | 10/1970 | Turpin | 23/259 X |
| 3,718,438 | 2/1973 | Anscherlik | 23/259 |

*Primary Examiner*—R. E. Serwin
*Attorney, Agent, or Firm*—Knobbe, Martens, Olson, Hubbard & Bear

[57] ABSTRACT

A system for transporting and accurately metering small quantities of fluids while avoiding application of destructive forces upon and deleterious flow related phenomena within the fluids being transported. While having more general application, the system has particular utility for forming and transporting very small discrete measured quantities (slugs) of fluid in automated chemical analysis apparatus. These fluid slugs are formed by detecting the lead meniscus of the fluid and automatically actuating a valve upstream so as to consistently produce slugs of known volume. These slugs are transported through a continuous fluid conduit by a push and pull combination of vacuum upon the leading meniscus and air pressure upon the trailing meniscus. These portions of the flow control valve disclosed herein as well as the entire fluid conduit which contacts the fluid are of plastic or glass materials which do not chemically react with any of the fluids under transport and which further provide a smooth, low friction flow surface which is readily washed between fluid transport operation.

17 Claims, 17 Drawing Figures

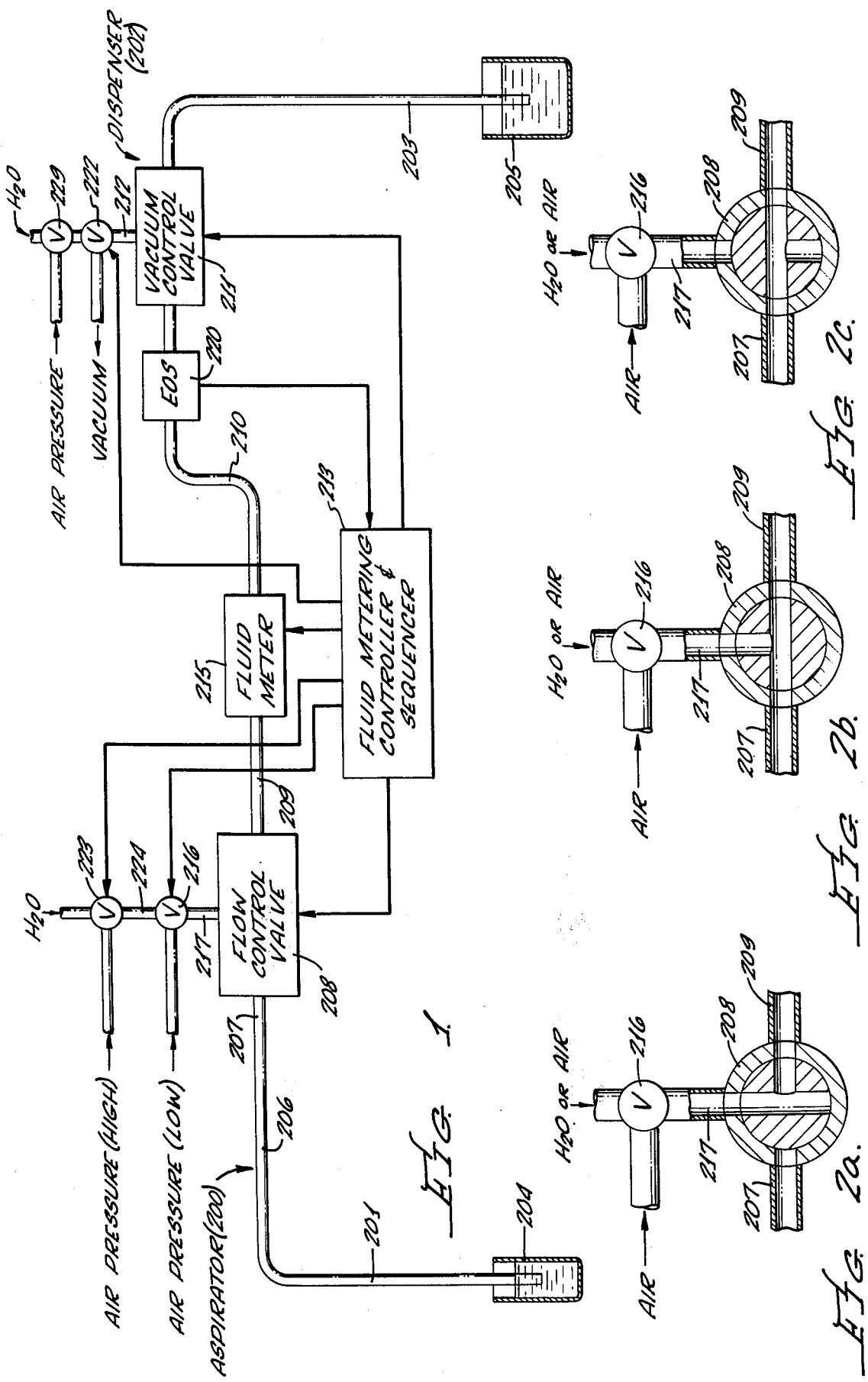

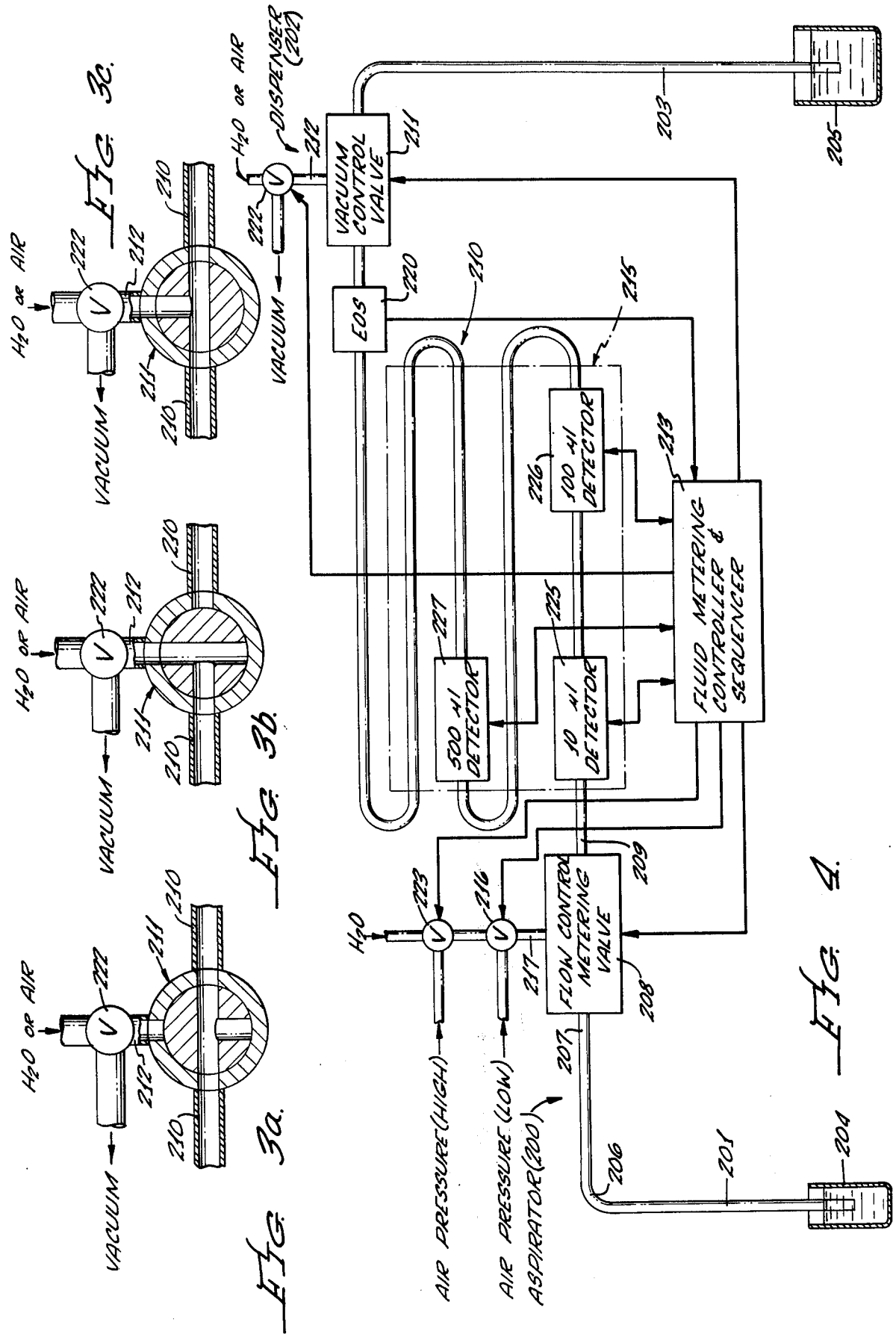

FIG. 7d.
AND GATE 294
OUTPUT (SLOW
FLUID FLOW)
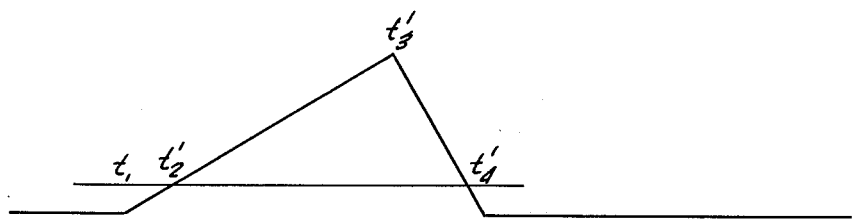
AND GATE 294
OUTPUT (FAST
FLUID FLOW)
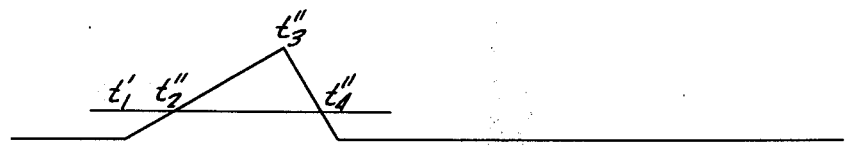

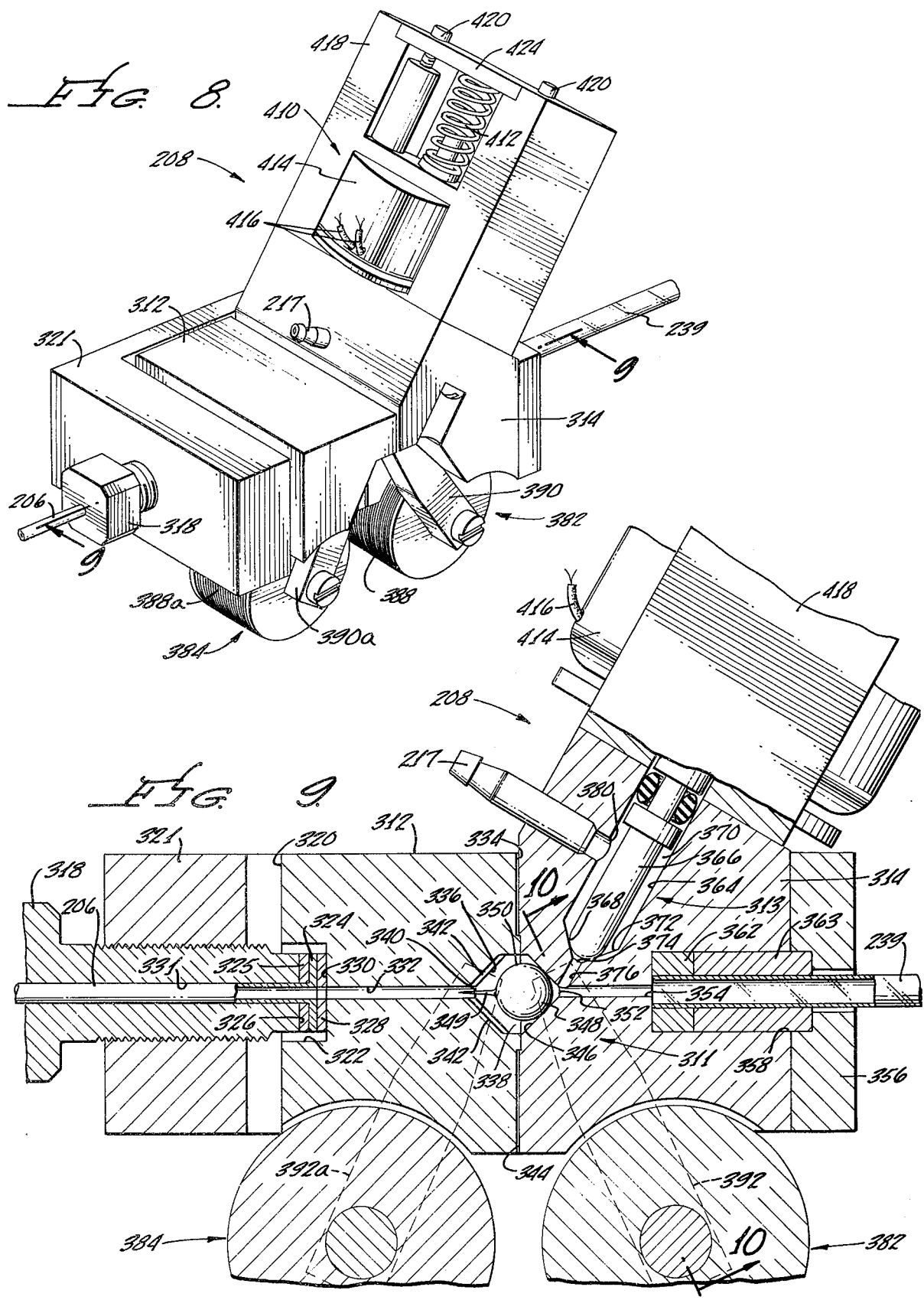

though fluid conduit and respond to the passage of the leading fluid meniscus therethrough to automatically close a flow control valve and form a slug of known volume. Plural detectors are advantageously spaced along the conduit so as to selectively produce slugs of different volume. As a result, the quantity of fluid ultimately dispensed is made up of a plurality of slugs each containing a known and precise quantity of liquid.

FLUID TRANSPORT AND METERING SYSTEM

BACKGROUND OF THE INVENTION

This invention relates to a system for precisely measuring and transporting small volumes of fluids. The system is especially suited for transporting fluids in automated chemical analysis apparatus, an exemplary apparatus being disclosed and claimed in the copending application of Robert R. Young, entitled "APPARATUS AND METHOD FOR AUTOMATIC CHEMICAL ANALYSIS Ser. No. 447,958," filed herewith and assigned to Anatronics Corporation, assignee of the present invention.

Although a number of different kinds of fluid transport systems have been devised, each of them have one or more limitations, particularly when utilized within a wet chemical analysis system. One such transport system commonly used employs a peristaltic pump which includes a motor driven cam physically engaging and squeezing a flexible tube. Since the tube must be continuously subjected to physical deformation, the tubing selected must be adapted to withstand the wear and tear associated with the peristaltic pump operation. Generally, the tubing selected is therefore not the optimum material which would otherwise be selected in order to obtain low wetting and other desirable properties such as chemical inertness and low friction flow. Moreover, peristaltic pumps by their nature have a limited life due to the stresses placed within the flexible tubing by the pumping action.

Another equally serious limitation of the peristaltic pump and other prior art transport systems as applied to automated chemical analysis equipment is that the pumping action places substantial physical stresses upon the fluid being transported. Thus, it is very important that whole blood, chemical enzymes, and certain other fluids be transported with minimum physical stress being placed upon the fluid as it is transported through the system. Whole blood, for example, is quite vulnerable and will suffer hemolysis when physically crushed or subjected to high external pressures.

A further disadvantage of metering systems employing pumps, whether peristaltic, piston, or other type, is that the accuracy of such systems suffer since such pumps do not precisely pump repeatable volumes of fluid.

SUMMARY OF THE INVENTION

In its preferred embodiment, the present invention provides a through flow of liquid from the aspirator to the dispenser by a combination of vacuum at the leading meniscus of the fluid and a flowing air pressure at the trailing meniscus thereof. Initially, a vacuum applied proximate the dispensing end draws the fluid through an aspirator cannula until a predetermined volume of fluid slug is retained in the fluid conduit. A flow control metering valve is then actuated and the fluid slug transported by a combination of vacuum at its leading meniscus and air pressure upon its trailing meniscus. This combination of push and pull forces with the through conduit absolutely minimizes the application of deleterious forces or stresses upon the fluid. In addition, the vacuum provides a highly accurate, repeatable means for transporting the fluid from the aspirating cannula to the fluid metering system so that precise repeatable quantities of fluid may be dispensed by the system.

The system disclosed herein further includes significant improvements in dispensing a precisely accurate measure of fluid. One or more metering detectors are spaced along the fluid conduit and respond to the passage of the leading fluid meniscus therethrough to automatically close a flow control valve and form a slug of known volume. Plural detectors are advantageously spaced along the conduit so as to selectively produce slugs of different volume. As a result, the quantity of fluid ultimately dispensed is made up of a plurality of slugs each containing a known and precise quantity of liquid.

The invention further contemplates providing a means for detecting and compensating for differences in the flow rates of fluid resulting from their having differing fluid properties. This compensation is achieved by measuring the velocity of the fluid meniscus as it passes through the fluid meter and delaying or speeding up the closure of the flow control valve to insure, for example that fluids of high and low viscosity produces fluid slugs of substantially identical volume.

Another feature of the present invention is provision of a flow control valve which has minimal dead volume thereby simplifying the cleaning of the valve as well as minimizing contamination between successive fluid transports. In brief, the valve comprises a magnetic actuator enclosed in a non-magnetic body and responsive to a pair of magnetic fields produced by electrical coils located respectively on inlet and outlet sides of the valve chamber. In addition to its low dead volume, the flow path within the valve is constructed of chemically inert materials which are easily cleaned. The valve structure provides a smooth non-vortexing flow of fluid therethrough. Construction of the valve is such that the fluid actuator may be quickly moved from the closed to the open position. Moreover, such movement is highly repeatable so that the valve operation does not affect the accuracy of the metering operation described above.

BRIEF DESCRIPTION OF THE DRAWINGS

FIG. 1 is a simplified block diagram of the fluid transport and metering system connecting the aspirator and dispenser;

FIGS. 2a, b, and c respectively show schematically the flow control and metering valve in its closed open-air/$H_2O$ open, and Open-air/$H_2O$ closed positions;

FIGS. 3a, b, and c respectively show schematically the vacuum control valve in its closed, open-outlet closed, and open-outlet open positions;

FIG. 4 is another block diagram of the fluid transport and metering system showing further details of the fluid meter;

FIG. 7d illustrates waveforms produced by fluids of different flow velocity;

FIG. 8 is a perspective view of the flow control metering valve;

FIG. 9 is a sectional view taken along the line 9—9 in FIG. 8; and

OVERALL DESCRIPTION OF THE FLUID TRANSPORT AND METERING SYSTEM

Figure 5:
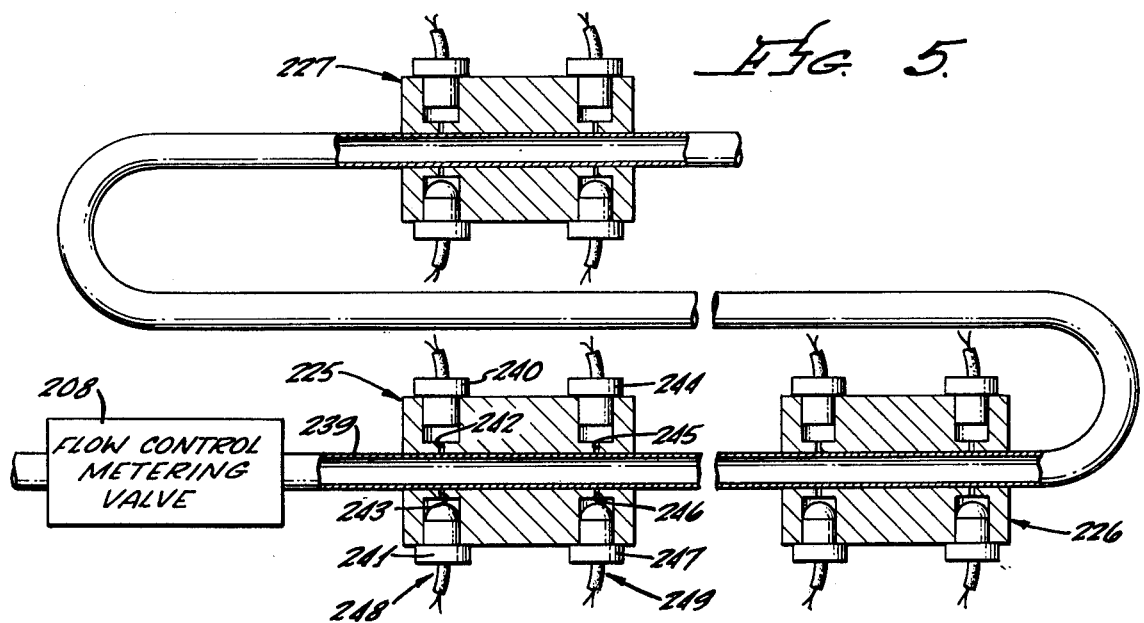
FIG. 5 is an elevation view of the fluid metering detectors included in the fluid metering system.

Referring to FIG. 1, the fluid transport system includes generally an aspirator 200 including an aspirating cannula 201 and a dispenser 202 including a dispensing cannula 203. Typically, as described in the copending application entitled "APPARATUS FOR AUTOMATIC CHEMICAL ANALYSIS," identified hereinabove, the aspirating cannula 201 is selectively positioned by an aspirator arm (not shown) and immersed in the container 204 from which fluid is to be withdrawn. Typically, in automatic analysis systems, the aspirating cannula may be positioned to withdraw fluid from sample specimens, dilution cells, and mix and incubator cells, container 204 symbolizing any of these separate receptacles. Similarly, the dispensing cannula 203 is typically selectively positioned by a dispenser arm (not shown) and immersed in container 205 to which fluid is to be dispensed, this container thus symbolizing mix and incubation cells, and cuvette chambers. Aspirator 201 is connected by conduit 206 to the inlet port 207 of flow control metering valve 208. The outlet port 209 of valve 208 is in turn connected by a continuous conduit 210 through a downstream vacuum control valve 211 to the dispensing cannula 203.

Conduits 206 and 210 and the wetted surfaces of valves 208 and 211 are preferably formed of a low wetting material both inert to the fluids being transported and providing low friction flow. Teflon quartz and glass may be advantageously used in the system since no portion of the flow path is subjected to compression or flexure.

Initially, the flow control metering valve 208 and vacuum control valve 211 are in their closed positions, schematically illustrated in FIGS. 2(a) and 3(a). As shown therein when valves 208 and 211 are in their closed position, fluid is prevented from passing between inlet and outlet ports 207, 209, and the vacuum at inlet 212 is disconnected from conduit 210.

To withdraw fluid from container 204, fluid metering controller and sequencer 213 actuates (i) the flow control valve 208 to its Open-Air/H₂O Closed position [shown schematically in FIG. 2(c)] (ii) two-way valve 222 to connect the vacuum inlet 212 of the vacuum control valve 211, and (iii) vacuum control valve to its Open-Outlet Closed position [shown schematically in FIG. 3(b)]. As a result, a vacuum is applied through the inlet 212 of vacuum control valve 211 through conduit 210 and flow control valve 208 to aspirating cannula 201. A preselected volume of fluid is then withdrawn from the container 204 through the aspirating cannula 201, conduit 206, valve inlet port 207, flow control valve 208, and valve outlet port 209 to the input of fluid meter 215. As described in more detail below, fluid meter 215 detects the leading meniscus at the front of the fluid within conduit 210 and supplies an electrical signal to controller and sequencer 213 which results in the automatic closing of the flow control metering valve 208, thus entrapping a known volume of fluid (described hereinafter as a fluid slug) in the conduit 210 between the flow control valve 208 and fluid meter 215.

The fluid slug thus formed is transported over the remainder of conduit 210 to the dispensing cannula 203 by applying air under pressure at the back or trailing meniscus of the fluid slug while continuing to apply the vacuum upon its leading meniscus. Sequencer 213 causes the requisite air pressure to be supplied by actuating two-way valve 216 to deliver low air pressure through Air/H₂O inlet port 217 of flow control valve 208 to the valve outlet port 209. As a result, a slug of fluid is formed by the dual action of the fluid meter 215 and flow control valve 208 and then transported through the conduit 210 by a push and pull action provided by the vacuum applied on the leading meniscus of the fluid slug and low pressure air on the lagging meniscus of the fluid slug. A particular advantage of this system is that substantially equal forces may be applied on opposite sides of the slug so as to eliminate or substantially minimize applying any deleterious compressive forces upon the fluid slug as it passes between the flow control valve and meter 215. As a result, fluids vulnerable to damage such as whole blood and enzymes may be safely transported by the system of this invention.

As described below, the fluid meter 215 advantageously produces a series of fluid slugs each containing a precisely metered volume of fluid. In this manner, a predetermined extremely accurate volume of fluid is measured and transported from the aspirator 200 to the dispenser 202.

The lead meniscus of the lead fluid slug so produced will eventually reach the EOS or end of slug detector 220 at which time a signal is supplied controller 213 resulting in closure of the vacuum control valve 211. At the same time, the air pressure is advantageously increased at the air/H₂O inlet port 217 of flow control valve 208 by actuating two-way valves 223 and 216 to supply the high pressure air on tube 224 to the Air/H₂O inlet port 217 of flow control valve 208 to blow out the slug through the dispensing cannula 203 into the selected discharge container 205.

As disclosed and claimed in the copending application "APPARATUS FOR AUTOMATIC CHEMICAL ANALYSIS," identified hereinabove, a thorough wash system is provided for completely cleaning out the transport after each aspirator and dispense operation. In this manner, contamination between successive fluid transports is avoided. Typically, the wash sequence is initiated by positioning both the aspirating cannula 201 and the dispensing cannula 203 over a fluid drain. Two-way valves 216 and 223 are then actuated by sequencer 213 to supply water or other cleaning fluid to the Air/H₂O inlet 217 of control valve 208. This latter valve is actuated to its Open-Air/H₂O Open position. Sequencer 213 also actuates vacuum control valve 211 to its Open-Outlet Open position [shown schematically in FIG. 3(c)] and two-way control valves 222 and 229 to supply water or other cleaning fluid to the vacuum/H₂O inlet port 212. As shown schematically in FIG. 2(b) and described in more detail below, the flow control valve is constructed such that this valve when in its Open-Air/H₂O Open position permits flowing water from the port 217 through both the fluid inlet 207 (in a reverse flow path) and outlet port 209, thereby washing the aspirating cannula 201, the entire length of fluid conduit 210 and dispensing cannula 203. Any portion of the vacuum control valve which came in contact with the fluid previously transported is thoroughly washed by virtue of the water flowing through its vacuum/$H_2O$ inlet port 212 and out through the dispensing cannula 203. After a thorough washing, e.g. flowing ten or more times the volume of water through the system than the fluid just previously transported, the two-way valves 223 and 229 are actuated to supply drying air under pressure to respective inlets 217 and 212 of flow control metering valve 208 and vacuum control valve 211. This air will flow through the entire system and out through the aspirating cannula 201 and dispensing cannula 203. After a short interval, the flow control valve 208 may be closed to divert all of the drying air through conduit 210 to the dispensing cannula 203. After another short interval, both flow control and vacuum control valves 208 and 211 are actuated to their closed positions and the system is ready for a subsequent fluid transport and metering operation.

DETAILED DESCRIPTION OF THE METERING SYSTEM

The manner in which the fluid meter 215 provides for the precise metering of a preselected volume of fluid is further illustrated in FIG. 4. As shown in the Figure, three metering detectors 225, 226, and 227 each coupled to fluid metering controller 228 are longitudinally positioned along the conduit 210. Each metering detector is adapted to form a slug of increasing known volume. In the particular example shown, the first metering detector 225 produces slugs of 10 $\mu l$; the second metering detector 226 produces slugs of 100 $\mu l$; and the third metering detector 227 produces slugs of 500$\mu l$ in volume. In addition, the system provides for a sufficient fluid volume between the third metering detector 227 and the end of slug detector 220 such that a precise amount of measured fluid made up of a series of slugs of known value may be ultimately dispensed through the dispensing cannula 203.

If, for example, it is desired to precisely dispense 1660$\mu l$ from container 205, three 500 $\mu l$; one 100 $\mu l$; and six 10 $\mu l$ slugs are successively produced as follows: The predetermined value of 1660 $\mu l$ is pre-set at the fluid metering controller and sequencer 213. The third metering detector 227 is physically located downstream from the flow control valve 208 a distance such that when it detects the passage of the lead meniscus of a slug and automatically closes off the flow control valve, a precisely measured 500 $\mu l$ of fluid is then entrapped in the conduit 210 after the flow control valve 208. As described above, this slug is transported in a push and pull manner by mutual application of vacuum through the vacuum control valve 211 and air under pressure through the air/$H_2O$ inlet port 217 of the flow control valve 208. Metering detector 227 detects when the trailing meniscus of this slug passes through it and supplies a corresponding electrical signal to fluid metering controller and sequencer 213 which in turn signals the flow control valve to reopen to its Open-air/-$H_2O$ closed position thus permitting fluid to flow from the aspirating cannula 201 through the flow control valve 208. The lead meniscus of this fluid flow is detected by the 500 $\mu l$ metering detector 227 in the same manner as before, at which time the flow control valve is once again closed and air injected to transport this second slug through the metering detector. In this hypothetical example, there will then be three 500 $\mu l$ slugs of fluid in the conduit 210 between the metering detector 227 and the end of slug detector 220. Fluid metering controller 213 then responds to electrical signals produced by the second metering detector 226 to produce in a similar manner one slug containing 100 $\mu l$ of fluid. Lastly, the controller 213 responds to signals produced by the first metering detector 225 to produce six slugs of fluid each containing 10 82 1. These 10 slugs of fluid are transported through conduit 210 until the lead meniscus of the first 500 $\mu l$ slug reaches the end of slug detector 220, following which the vacuum is turned off and all of the slugs blown out of the dispensing cannula 203 in the manner described above.

Figure 6:
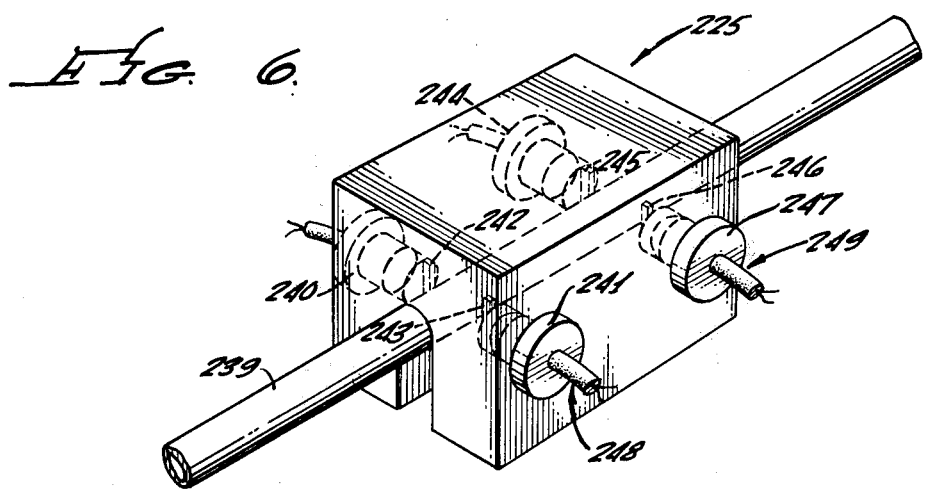
FIG. 6 is an orthogonal view of a fluid metering detector.

A detailed illustration of the metering system described above is shown in FIGS. 5 and 6. That portion of the fluid transport conduit 210 from the flow control valve 208 to the metering detectors comprises a transparent tube 239 advantageously formed of quartz so as to minimize volumentric changes with temperature between the valve 208 and detectors 225, 226 and 227. As shown, detector 225 includes a first radiation source 240 and corresponding first radiation responsive detector 241 mounted on opposite sides of the tube 239. A narrow slit 242 located between source 240 and the tube 239 directs a narrow beam of energy through a corresponding slit 243 located between the opposite side of the tube and detector 241. A second radiation source 224, narrow slits 245 and 246, and second radiation responsive detector are longitudinally spaced along the quartz tube a predetermined distance from the first energy source and detector. Excellent results have been achieved by providing sources 240, 244 and infra-red light sources and detectors 241, 247 as infra-red detectors thereby minimizing interference from light in the visual spectrum. When the tube 239 is either empty or full of a fluid transparent to infra-red radiation, the sources 240, 241 direct narrow slits of radiation through both the tube and the opposing slits onto the detectors 241, 247. When, however, a fluid meniscus is juxtaposed, the slits 242, 243 or 245, 246, the light beam is distorted so as to interrupt or substantially reduce the amount of radiation reaching the detector. This interruption or reduction of radient energy causes a corresponding interruption or reduction of current at the output of the detector. As described below, the resultant electrical pulses on the output leads 248 and 249 of radiation detectors 241, 247 are employed for controlling operation of the flow control valve 208.

DETAILED DESCRIPTION OF THE FLOW CONTROL METERING VALVE

FIG. 8 shows a preferred embodiment of the flow control metering valve 208 including an inlet port body 312 and an outlet port body 314. Shown more specifically in FIG. 9, the metering valve 208 contains a measuring valve 311 and an injector valve or inducing valve 313. In FIG. 8, conduit 206 of aspirator 200 is connected to the inlet port body 312 by the tube end fitting 318. With respect to FIG. 9, located on the outside end 320 of the inlet port body is a cavity 322 which receives conduit 206. Formed on the end of the conduit 206 is a flange 324 which is larger than the diameter of the conduit 206 and fits between a sealing ring 325 and the washer 328 which is set at the bottom 330 of the cavity 322. The conduit 206 extends through an open channel 331 running the length of the tube end fitting 318. The tube end fitting 318 is threaded within the mounting 321 so that as the tube end fitting 318 is turned further into the cavity 322 the flange 324 is tightly secured between the sealing ring 325 and the washer 328 by the forward end 326 of the tube end fitting 318. This provides for a tight sealed connection of the conduit 206 to the inlet port body 312 of the flow control metering valve 208 in such a manner to provide no obstacles to the flow of a fluid proceeding through the conduit 206 and into the inlet port body 312.

Extending from the bottom end 330 of the cavity 322 through the inlet port body 312 is an inlet channel 332 which is aligned with the conduit 206 and runs to the inside surface 334 of the inlet port body 312. Located within the inside surface 334 of the inlet port body 312 is the inlet portion 336 of the measuring valve chamber 338 of the metering valve 208. The inlet portion 336 of the valve chamber 338 has a funnel shape having a throat 340 which receives the inlet channel 332. Located in the surface of the inlet portion 336 of the valve chamber 338 are two flutes or grooves 342 which are oriented approximately 180° from each other.

The inside face 344 of the outlet port body 314 is positioned adjacent the inside surface 334 of the inlet port body 312. Located within the inside face 344 of the outlet port body is the outlet portion 346 of the measuring valve chamber 338. The outlet portion 346 of the valve chamber 338 is in the shape of a funnel similar to the shape of the inlet portion 336 of the valve chamber. Freely movable within the valve chamber 338 is a valve element 348 which is comprised of a ferromagnetic material. When the valve element is positioned within the outlet portion 346 of the valve chamber, the surface 350 will contact the outlet portion 346 of the valve chamber and prevent flow of a fluid from leaving the inlet channel 332. The valve element 348 has a general spherical shape with a protruding stub 349 that slides within the inlet channel 332. The diameter of the stub 349 is less than the diameter of the inlet channel 332, so that flow through the inlet channel is not curtailed. The preferred embodiment of the valve element 348 is comprised of ferromagnetic particles encased in glass which is necessary as an inert surface for contact with the fluid flow. Alternatively, the valve element could be a spherical shape of ferromagnetic material encased in some other type of inert substance. The necessity of ferromagnetic material will be discussed below.

Located at the throat 352 of the outlet valve portion 346 is an outlet port which is connected to an outlet or dispensing channel 354 which is located within the outlet port body 314 in approximate alignment with the inlet channel 332. Located adjacent the outside end surface 356 of the outlet body section 314 there is a cavity 358 which receives the upstream end of a quartz tubing portion 239 of the conduit 210. The interface between the outlet or transfer channel 354 and the outlet tube 239 is secured by seals 362 and 363.

An injector or secondary valve 313 with a valve chamber 364 is located within the outlet port body 314 adjacent the measuring or control valve 311. Slidably mounted within the injector valve chamber 364 is a valve element 366 which has a cylindrical shape with a semi-spherical end 368. The internal diameter of the injector valve chamber 364 is greater than the outside diameter of the valve element 366, so that there is a surrounding gap area 370 where a fluid may flow. The outlet end 372 of the injector valve chamber is shaped like a funnel having a throat 374 which connects with an injector channel 376. The injector channel 376 connects with the throat 352 of the outlet portion 346 of the measuring valve 311, so that the injector channel 376 is in liquid communication with both the valve chamber 338 and the outlet channel 354. Connecting the injector valve chamber 364 with an outside source of liquid or gas is a coupling member or entry port 217 which is mounted within the outlet port body 314. The coupling 217 has an interface 380 with the injector valve chamber 364.

Figure 10:
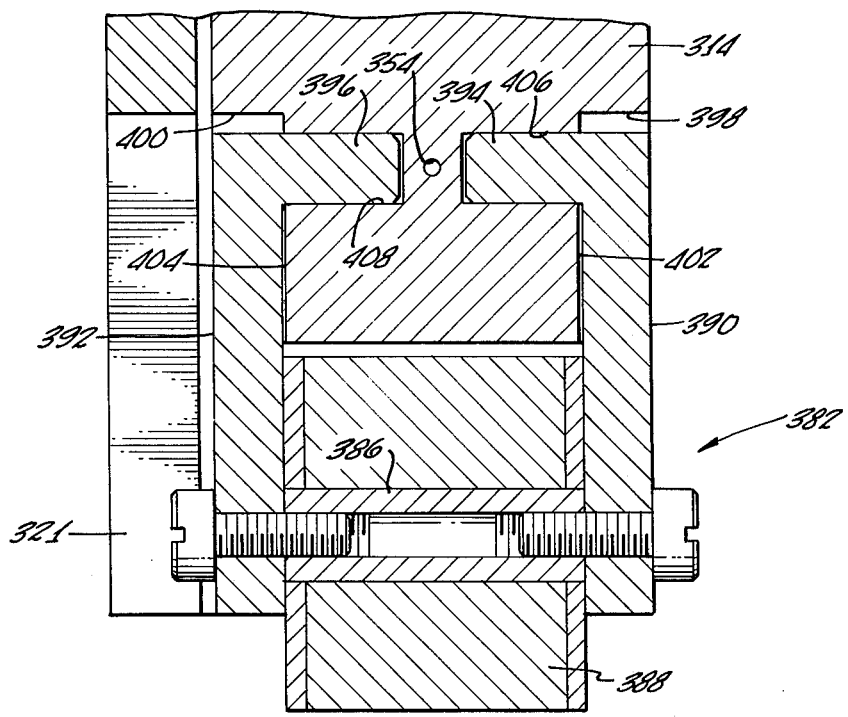
FIG. 10 is a sectional view taken along the line 10—10 in FIG. 8.

Referring now to FIG. 8 and FIG. 10, located adjacent the inlet port body 312 and the outlet port body 314 are a pair of pole piece assemblies, a stop or closed position pole assembly 382 and a go or open position pole assembly 384. Shown on FIG. 10 is the stop position pole piece 382 with a pole center 386 around which the electrical coil 388 is wound. Extending from each end of the centerpiece 386 are a first yoke member 390 (shown in phantom on FIG. 9) and a second yoke member 392 on which are mounted respectively a first magnetic pole unit 394 and a second magnetic pole unit 396. On each side of the outlet port body 314 adjacent the outlet channel portion 354 are indented spaces 398 and 400 to accommodate the yoke pieces 390 and 392 respectively. Positioned within the indented wall 402 of indented space 398 and wall 404 of indented space 400 are cavities 406 and 408 which respectively receive the pole units 394 and 396 within the outlet port body 314 adjacent its inside surface 344. The go position pole piece 384 has the same exact configuration as the stop position pole piece 382 and, therefore, when speaking with respect to the go position pole piece 384, all elements will be indicated with the same numerals as those on the stop position pole piece 382 with a suffix *a* behind each number. The go position pole piece 384 is positioned within the indented spaces 398*a* and 400*a* within the inlet port body 312 and adjacent its inside surface 334. Although not specifically shown in FIG. 9, the pole units 394 and 396 of the stop position pole piece 382 are situated adjacent the outlet portion 346 of the measuring valve 311. Alternatively, the pole units 394*a* and 396*a* of the go position pole piece 384 are situated adjacent the inlet portion 336 of the measuring valve 311.

Referring to FIGS. 8 and 9, the injector valve element 366 is connected to a solenoid assembly 410. This assembly includes a spring 412 and a solenoid 414 which is operated through the signal input connections 416. The spring 412 maintains the valve element 366 of the injector valve in a closed position within the outlet end 372 of the injector valve chamber 364. The activation of the solenoid 414 will cause the injector valve element 366 to move out of engagement with the outlet end 372 of the chamber 364. The solenoid 414 is mounted within a solenoid housing 418 which is connected to the outlet body section 314. The spring 412 is contained within the solenoid housing 418 by a retaining plate 424 attached to the solenoid housing by a pair of bolts 420.

In the operation of the metering valve 311 in FIGS. 9 and 10, the go position pole piece 384 is energized causing a magnetic flux to develop between the first magnetic pole unit 394*a* and the second magnetic pole unit 396*a* which will cause the ferromagnetic valve element 348 to be attracted toward the go position pole piece 384. Consequently, the valve element 348 will be moved into engagement with the inlet portion 336 of the measuring valve chamber 338. The inducing or injector valve element 366 is positioned with the semi-spherical end 368 in engagement with the outlet end 372 of the injector valve chamber 364, closing the injector valve 313. As described above and shown in FIGS. 1 and 4, a vacuum control valve 211 downstream from the flow control metering valve 208 is opened to introduce a vacuum within the conduit 210 and within the measuring valve chamber 338 of the metering valve 208. This vacuum will cause fluid to be drawn into the conduit 206 up to the front end of the aspirator tube 206 and into the inlet channel 332 of the inlet port body 312. The fluid flowing into the inlet channel 332 will proceed to the throat 340 of the inlet portion 336 of the measuring valve chamber 338. The valve element 348 will be located in the go or open position adjacent the inlet portion 336 of the valve chamber 338. The fluid will flow through the flutes 342 which are cut into the surface of the inlet portion 336 and proceed around the valve element 348 and into the outlet channel 354 of the outlet port body 314. The fluid will flow from the outlet channel 354 into the quartz tubing 239 and proceed downstream from the metering valve 208.

When the required amount of fluid has proceeded downstream in the tubing 239, the fluid meter 215 of FIGS. 1 and 4 causes the fluid metering controller and sequencer 213 to signal the measuring valve stop position pole piece 382 to activate and deactivate the go position pole piece 384. This will cause the valve element 348 in FIG. 9 to move into engagement with the outlet portion 346 of the valve chamber 338. The contact of the surface 350 of the valve element 348 with the outlet portion of the valve chamber will close the measuring valve 311, preventing further flow of fluid entering the outlet channel 354. A subsequent signal is directed to the solenoid 414 through the electrical connections 416 in FIG. 8 to activate the solenoid compressing the spring 412 and causing the valve element 366 to move upward with respect to FIG. 9. Consequently, the semi-spherical end 368 will move out of engagement with the outlet end 372 of the injector valve chamber 364. Air is injected through the coupling 217, through the interface 380 and into the gap 370 of the injector valve chamber 364. This air will proceed down into the outlet end 372, through the injector channel 376, and into the outlet channel 354 of the outlet port body 314. This air is typically under approximately 2 psi pressure and establishes a trailing meniscus to the first fluid which has proceeded into the outlet tube 239 as discussed above. Once the proper amount of air has been introduced into the outlet channel 354 and the outlet tube 239, a signal is sent to the solenoid 414 in FIG. 8 to deactivate, causing the spring 412 to force the injector valve element 366 down into engagement with the outlet end 372 of the injector chamber 364 as shown in FIG. 9. Consequently, the injector valve chamber 364 is sealed from the outlet channel 354.

With respect to FIG. 8, the go position pole piece 384 is again activated and the stop position pole piece 382 is deactivated causing the valve element 348 is FIG. 9 to move adjacent the inlet portion 336 of the measuring valve chamber 338 to again allow a first fluid to flow from the inlet channel 332 through the valve chamber 338 and around the valve element 348 into the outlet channel 354. The process as explained above is again repeated for each desired measured amount of fluid flowing through the measuring valve 311.

Once the desired measured amounts of fluid have been transferred through the measuring valve, it is necessary to wash the entire system, including the valve element 348, the valve chamber 338 with the flutes 342, the inlet channel 332 and outlet channel 354 with respective conduits 206 and 210. This is done by activating the go pole piece 384 and deactivating the stop position pole piece 382, so that the valve element 348 is positioned adjacent the inlet portion 336 of the valve chamber 338 with reference to FIG. 9. The injector valve element 366 is moved upward with respect to FIG. 9 to open or move the semp-spherical end 368 out of engagement with the outlet end 372. Water is injected through the coupling 217 into the interface portion 380 for flow through the injector valve chamber 364. This water flows down through the outlet end 372 into the injector channel 376. The water will then flow in two directions. The first direction will be into the measuring valve chamber 338 and around the surface 350 of the valve element 348, through the flutes 342 and into the inlet channel 332 and aspirator tube 206. The second direction will be into the outlet channel 354 and into the quartz tubing 239. This water will not only clean the measuring valve area with its respective inlet and outlet channels, but also will clean the fluid conduits both upstream and downstream.

After a sufficient amount of washing has been accomplished, the water is removed from the coupling 217 and air is injected through the coupling 217 to dry the interior of the injector valve chamber 364 and the measuring valve chamber 338. Also, the air is utilized to dry all the adjacent areas such as the injector channel 376, the flutes 342 of the measuring valve, the inlet channel 332, conduit 206, outlet channel 354 and the conduit 210. As a result, the flow control metering valve 208 is ready to receive another fluid to be measured in specific quantities to flow through the mechanism.

It should be noted that a valve having essentially the same construction as the flow control metering valve 208 could be incorporated as the vacuum valve mentioned above and located downstream from the position of the flow control metering valve 208. The primary difference of the vacuum valve with respect to the flow control metering valve 208 would be the fact that the injector valve 313 would be mounted within the inlet port body 312 with the injector channel 376 in liquid communication with the throat 340 of the inlet channel 332, so that, when a vacuum source is connected to the coupling 217, the valve element 348 will be drawn adjacent the inlet portion 336 and will allow the vacuum to flow through both the inlet channel 332 and the outlet channel 354. In order to provide a compatible environment for the flow of the fluid to avoid any disruption to the chemical characteristics of the fluid, any of the valve components which contact the fluid are made of an inert substance such as Teflon. More particularly, the inlet port body 312 and the outlet port body 314 are constructed of Teflon.

DETAILED DESCRIPTION OF FLUID VELOCITY MEASURING SYSTEM

A important feature of this invention is that the metering system permits a very precise volumetric measurement of fluid substantially independent of the viscosity and surface tension characteristics of the fluid being transported and measured. This operation is achieved by detecting not only the presence of the fluid meniscus, but also its velocity as it passes through the metering detector. Thus, assuming that a constant vacuum is maintained while fluids are transported from the flow control valve 208 to the metering detector, the fluid velocity will be determined by the physical properties of the fluid, particularly its viscosity and surface tension. Thus, a fluid of high viscosity will travel through the conduit 210 at a lower velocity than a fluid of lower viscosity; likewise, a fluid of high surface tension will travel at a lower velocity than a fluid of low surface tension. As a result, a somewhat higher, albeit small volume of fluid of low viscosity (or low surface tension) will flow through the flow control valve 208 in a given time interval than fluid of higher viscosity (or higher surface tension). The present invention compensates for the variable flow properties of different fluids by utilizing the pulse outputs of the spaced radiation detectors 241, 247.

The first radiation detector 241 causes an electrical pulse on leads 248 prior in time to production of a pulse on the output leads 249 of the second radiation detector, this time delay being equivalent to the time that it takes the meniscus to pass from the first to second narrow slit of radiation. This time delay is directly proportional to the velocity of the fluid. The time delay between these pulses is measured and integrated to obtain an electrical signal proportional to fluid velocity. This signal is in turn used as proportional a control signal to the flow control such that the flow control valve is turned off sooner for liquids of lower viscosity or lower surface tension than fluids of higher viscosity or higher surface tension.

Figure 7A:
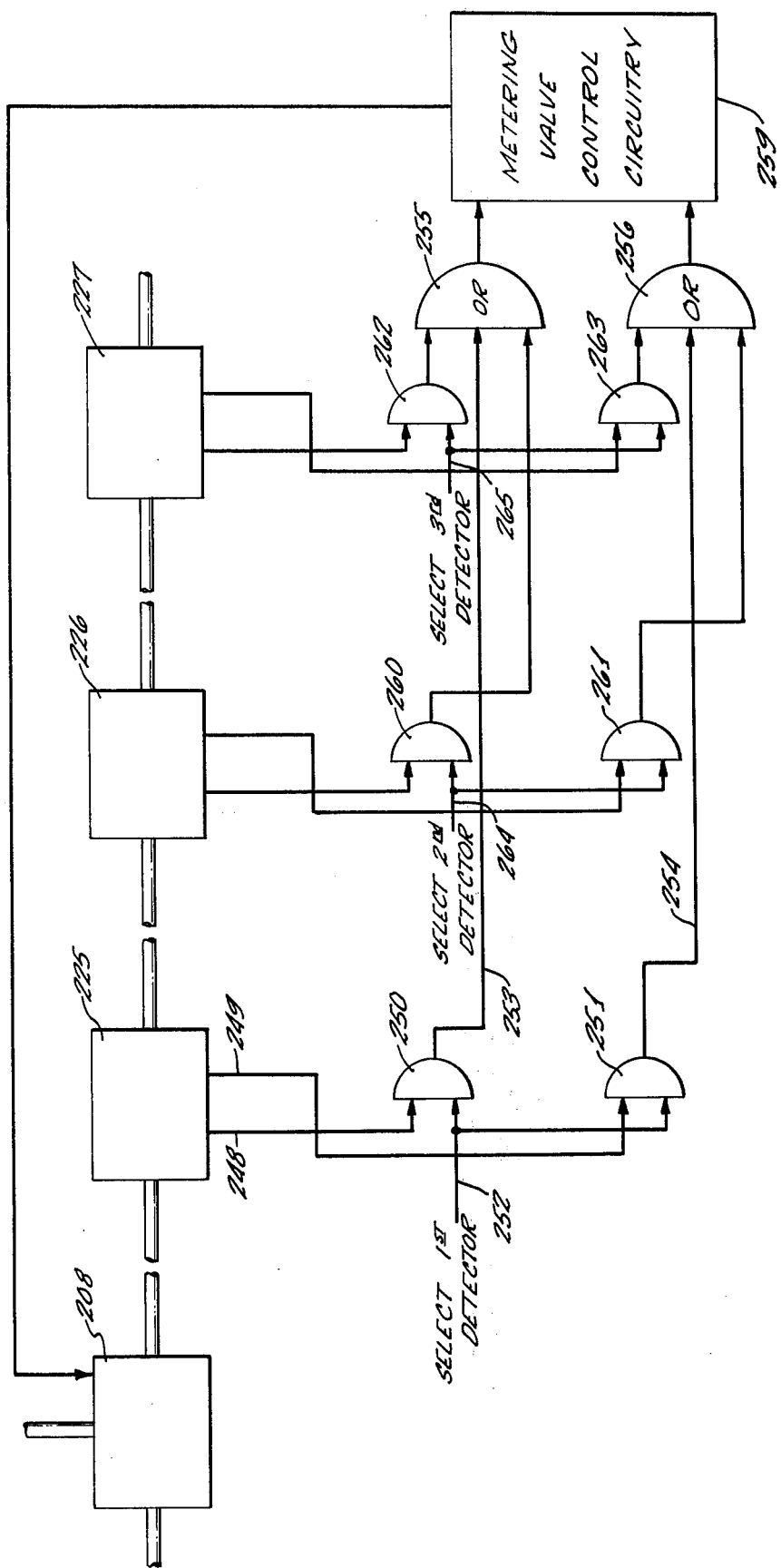
FIG. 7a is a schematic of the circuit used for selecting one of a plurality of metering detectors to vary the fluid volume contained within a fluid slug.

FIG. 7a shows the circuit schematic for selecting one of the three metering detectors 225, 226 or 227 for controlling energization of the flow control metering valve 208. As shown, the outputs 248 and 249 from the first and second radiation detectors of metering detector 225 are connected to first inputs of respective AND gates 250 and 251. The Select First Detector lead 252 is connected to the second input of each of the AND gates 250 and 251. Thus, energization of lead 252 enables AND gates 250 and 251 so that the respective pulses on leads 248 and 249 appear at the outputs of these gates on output leads 253, 254. These outputs are in turn connected to respective inputs of OR gates 255 and 256. The outputs 257, 258 of these OR gates are in turn connected to the metering valve control circuitry 259 of the sequencer and controller 213.

Similarly, the metering detectors 226 and 227 are coupled to respective AND gate pairs 260, 261 and 262, 263, whose outputs are in turn connected to OR gates 255, 256. Selection of the Select Second Detector lead 264 will thus cause the metering valve control circuit 259 to respond to the output pulses of metering detector 226. Energization of the Select Third Detector lead 265 similarly will supply this control circuitry with the outputs of metering detector 227.

Figure 7B:
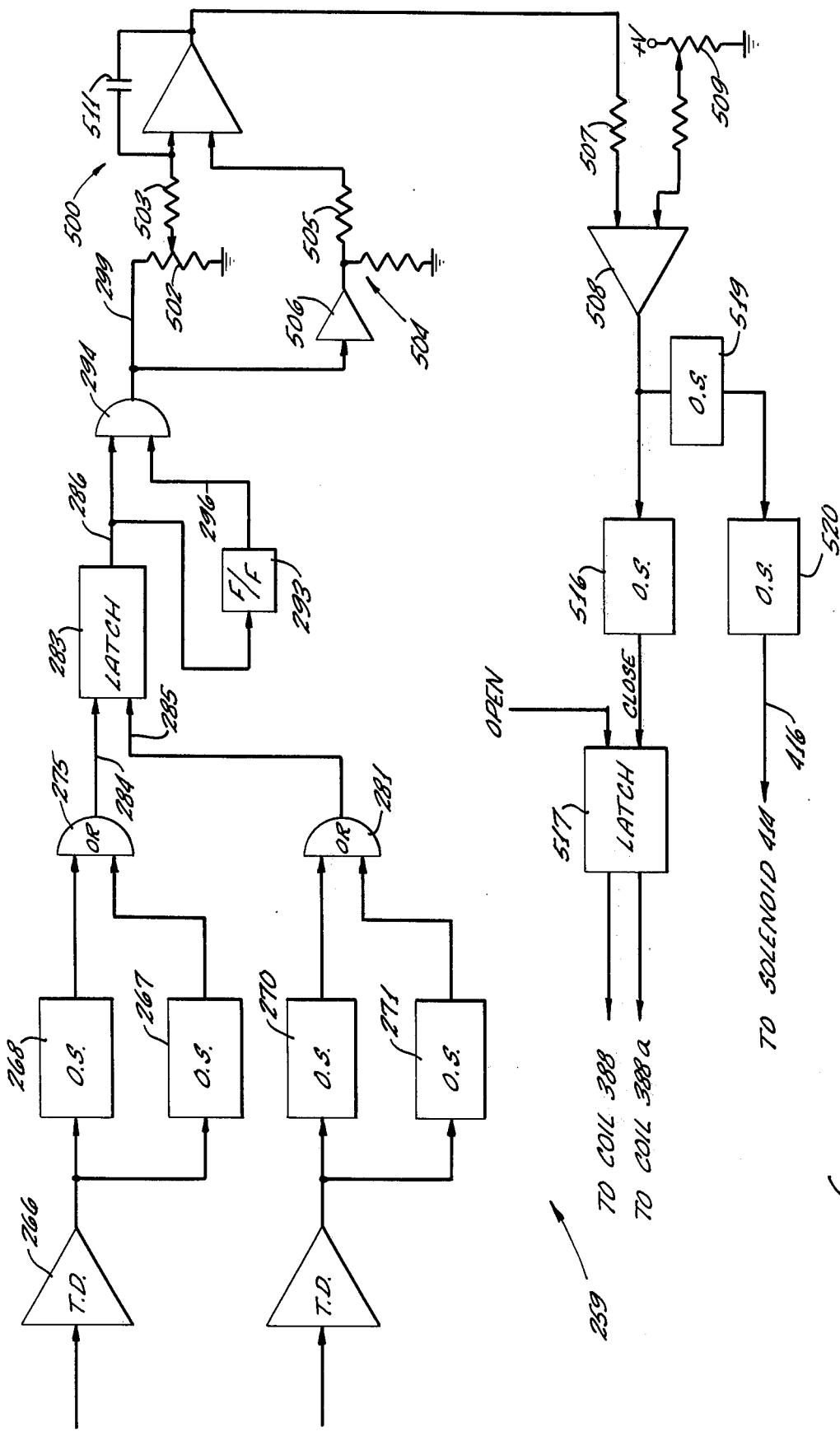
FIG. 7b is a schematic of the circuitry used for converting the metering detector pulse outputs to a proportional control signal for actuating the flow control valve.

The metering valve control circuitry is shown schematically in FIG. 7b. The outputs of OR gates 255 and 256 of FIG. 7a are respectively connected to threshold detectors 266 and 267. The threshold level is preselected so as to insure that only pulses produced by passage of a fluid meniscus through the selected metering detector will cause one shot multivibrators 268, 269, 270 and 271 to fire. One shot multivibrators 268 and 269 are responsive to the first radiation detector of the selected metering detector. Of these, one show multivibrator 268 is responsive to positive going pulses and the one shot multivibrator 269 is responsive to negative going pulses.

A feature of this invention is that the one shot multivibrator stages provide a means for detecting passage of meniscus regardless of whether or not the fluid is opaque to the radiation utilized in the metering detector. Referring to the timing diagram of FIG. 7c, fluid transparent to the detecting radiation will supply a narrow pulse 272 at time $t_1$ corresponding to passage of the meniscus past the first radiation detector. The leading (positive going) edge of this pulse produces a pulse on the output of one shot multivibrator 269 and the trailing (negative going) edge of this pulse produces a second pulse at the output of one shot 269. These two pulses appear at the output of OR gate 275 as a pair of respective pulses 273 and 274. On the other hand, opaque fluids do not produce a narrow pulse at the output of the radiation detector, but rather produce a signal level change (waveform 276) which is maintained so long as opaque fluid passes through the detectors. This is so because it is assumed that the opaque fluid prevents passage of radiation to the detector. As a result, only the single pulse 277 produced by one shot multivibrator 268 when the level of 276 changes positively at $t_1$, appears at the output of OR gate 275 when an opaque fluid is passing through the detector.

Figure 7C:
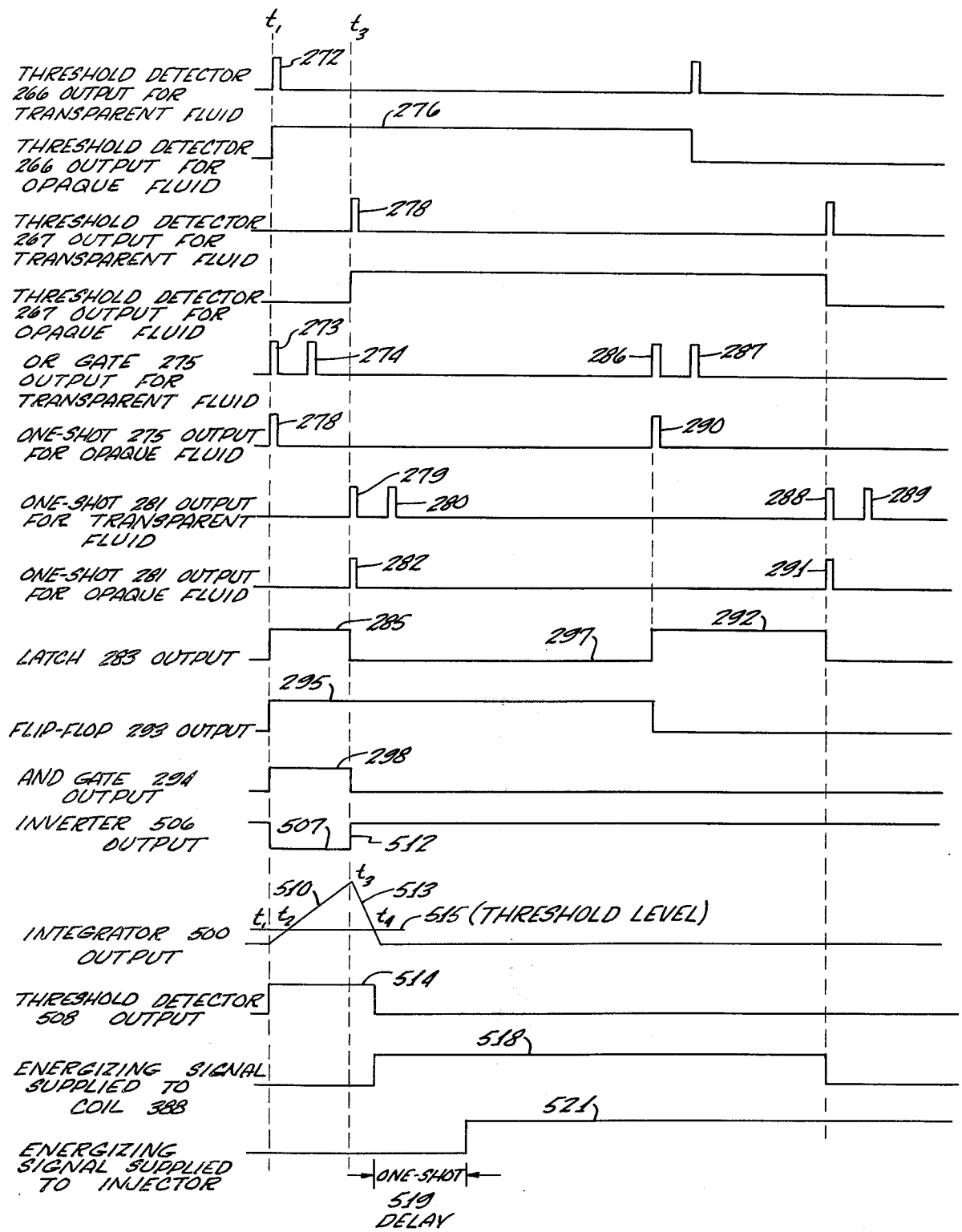
FIG. 7c illustrates certain of the waveforms occurring in the circuit of FIG. 7b.

As previously described, each metering detector includes a second radiation detector which will produce pulses a short time after the first radiation detector as the meniscus passes the second detector stage. This operation is also shown in FIG. 7c. As before, transparent fluids result in a single narrow pulse 278 on the inputs of respective one shot multivibrators 270 and 271 at time $t_3$. As a result, a pair of pulses 279, 280 appear at the output of OR gate 281 when transparent fluids are passing through the detector, whereas only a single pulse 282 is produced at the output of OR gate 281 for opaque fluids.

The output pulses produced by the first and second radiation detectors are combined at latching stage 283. This latch is turned "on" by pulses supplied to its input 284 from the output of OR gate 275, i.e. pulses originating at the first radiation detector, and turned "off" by pulses supplied to its input 285 from the output of OR gate 281, i.e. pulses originating at the second radiation detector. By way of example, receipt of pulse 273 from OR gate 275 at time $t_1$ turns the latch on. The second pulse 274 from OR gate 275 has no effect on the latching circuit since it is already turned on. Subsequently, at time $t_3$, the latch circuit is turned off by the first pulse 279 from the second OR gate 281. As a result, a rectangular waveform whose period corresponds to the time between $t_1$ and $t_3$ is produced at the output of latch 283 on lead 286. It will be seen therefore that the period of this waveform is equivalent to the time that it takes the meniscus to pass from the first to the second radiation detector within a metering detector.

Opaque fluids produce the identical result as transparent fluids. Thus, the first single pulse 278 at time $t_1$ causes the latch to turn on and the second single pulse 282 at time $t_3$ causes the latch to turn off. It will thus be seen that the system is insensitive to fluids whether they are transparent or opaque to the radiation used within the metering detector.

As described above, the fluid transport and metering system is designed to produce a slug of fluid of predetermined volume. Thus, a second meniscus will eventually flow through the metering detector which in turn will produce first and second pairs of pulses 286, 287 and 288, 289, or a single pulse 290 and 291 at the output of threshold detectors 275 and 281 depending upon whether or not the fluid is transparent or opaque. These pulses will ultimately produce a pulse 292 of rectangular waveform corresponding to passage of the trailing meniscus through the metering detector. This second pulse 292 is blanked by flip-flop 293 and AND gate 294. Flip-flop 293 is edge triggered by the leading positive edges of pulses at the output of latch 283. Thus, the flip-flop output is turned on at time $t_1$ corresponding to the leading positive edge of pulse 285 and is not turned off until a subsequent leading positive edge of the pulse 293 corresponding to the trailing meniscus to provide blanking waveform 295 at its output 296. This blanking waveform 295 is ANDED with waveform 297. As a result, only pulse 298 appears at the output 299 of AND gate 294 corresponding in time with the pulse 285.

The output 299 of AND gate 294 is supplied to an integrating stage 500. This stage includes a differential amplifier 501 having a first input connected to a potentiometer 502 through input resistor 503 and second input connected to a potentiometer 504 through input resistor 505. A capacitor 511 is connected between the output and input of this amplifier. The pulse 298 at the output of AND gate 294 is inverted in stage 506 to provide the inverted rectangular waveform 507 shown in FIG. 7c. The output of integrating stage 500 is connected through input resistor 507 to input of a threshold detector comprising differential amplifier 508 whose other input is connected to a preset voltage level set by potentiometer 509 to establish a threshold level 515 (FIG. 7c).

The operation of the integration stage is as follows: The integrator integrates the rectangular waveform 298 to produce a ramp output waveform 510 whose slope is determined by the setting of potentiometer 502. At time $t_3$, pulse 298 terminates. However, the integration continues but in the opposite direction as a result of the signal rise at 512. The slope of this second ramp 513 is determined by the setting of potentiometer 504. Accordingly, a rectangular waveform 514 is produced at the output of threshold detector 508 whose leading edge at $t_2$ corresponds to the crossing of the threshold level 515 by the output of the integrator and trailing edge at time $t_4$ corresponds to recrossing of threshold level 515 by the integrator output waveform.

Waveform 514 thus generated at the output of the threshold detector 508 is used for actuating the flow control valve 208 to produce the desired fluid slug. Thus, at time $t_4$, a one shot multivibrator 516 is energized to supply a signal to latch 517 resulting in applying energizing signal 518 to the stop coil 388 and a corresponding de-energizing signal (not shown) to the go coil 388a thereby closing the valve 208. At a predetermined later time, determined by the period of one shot multivibrator 519, a third one shot 520 is energized to supply an energizing signal 521 to the injector solenoid 414 over lead 416.

It will be noted that the time at which the flow control metering valve is closed is proportional to the velocity of the fluid since time $t_4$ is a composite of the time delay between times $t_1$ and $t_3$ and times $t_3$ and $t_4$, the latter delay being proportional to the integration rates of the integrating stage 500 and the time period between $t_1$ and $t_3$. As a result, it will be apparent that fluids flowing through the metering detector at a relatively high velocity will cause the metering control valve to be closed at a time $t_4$ sooner than a slower moving fluid. This operation is illustrated in FIG. 7d wherein a slower moving fluid produces a pulse 507a at the output of AND gate 294 and a corresponding closing actuation of flow control valve 208 at a time $t_4'$ whereas a fluid of higher velocity (such as would normally occur with fluid of lower viscosity of lower surface tension) will produce a closing of the valve at an earlier time $t_4''$.

What is claimed is:
1. In an automated apparatus for performing chemical analysis including a fluid transport system for transporting fluid from an aspirator to a dispenser through a fluid conduit, the improvements comprising:
   said fluid conduit being continuous and of non-varying internal volume while the fluid is being transported therethrough;
   means proximate said dispenser for supplying a substantially constant vacuum to said fluid downstream of said aspirator;
   metering detector means for detecting passage of the fluid meniscus at a predetermined location along said conduit;
   flow control means downstream of said aspirator and responsive to said metering detector for interrupting the flow of fluid upstream of said metering detector so that a slug of fluid is entrapped in said conduit between said flow control means and said metering detector; and
   means for automatically supplying gas under pressure to the trailing meniscus of said fluid slug for moving said fluid slug through said conduit.

2. In an automated apparatus for performing chemical analysis including a fluid transport system for transporting fluid from an aspirator to a dispenser through a fluid conduit in accordance with claim 1, further comprising:
   plural metering detectors located at predetermined positions along said conduit each responsive to the passage of the fluid meniscus therethrough; and
   means selectively responsive to said fluid detectors for automatically producing slugs of different volume corresponding to the fluid entrapped between said flow interrupting means and the selected metering detectors.

3. In an automated apparatus for performing chemical analysis including a fluid transport system for transporting fluid from an aspirator to a dispenser through a fluid conduit in accordance with claim 1 wherein said metering detector means measures the velocity of fluid meniscus so that the time at which the said interruption of fluid flow occurs is proportional to the rate of flow of the fluid through said conduit.

4. In an automated apparatus for performing chemical analysis in accordance with claim 3, said metering detector means further comprising:
   first and second radiation sources spaced along said conduit and first and second radiation detectors positioned along said conduit such that the radiation path is interrupted between said respective source and detector by a fluid meniscus.

5. In an automated apparatus for performing chemical analysis in accordance with claim 4, said metering detector means further comprising:
   means for producing a signal corresponding to the time interval between the passage of said meniscus past said first radiation detector and said second radiation detector.

6. In an automated apparatus for performing chemical analysis including a liquid transport system for transporting liquid from a first location to a second location, the improvements comprising:
   a liquid conduit for transporting liquid from said first location to said second location;
   means for applying a combination of push and pull forces upon said liquid to transport said liquid from said first location to said second location, comprising:
      means coupled to said liquid conduit for injecting gas under pressure into said liquid conduit, and
      means coupled to said liquid conduit for supplying a vacuum to said liquid conduit.

7. In an automated apparatus as defined in claim 6 the additional improvements comprising:
   said means for injecting gas comprises:
      a source of gas under pressure; and
      a first electrically operated valve connecting said source of gas under pressure to said third location; and
   said means for supplying vacuum comprises:
      a vacuum source; and
      a second electrically operable valve connecting said vacuum source to said fourth location.

8. In an automated apparatus for performing chemical analysis as defined in claim 7 the additional improvements comprising:
   means for alternately opening and closing said first electrically operable valve to intermittently inject gas at said third location.

9. In an automated apparatus for performing chemical analysis as defined in claim 6 the additional improvement comprising:
   said means for injecting gas under pressure and said means for supplying a vacuum comprise the sole means for imparting motion to said liquid to transport said liquid from said first location to said second location.

10. A fluid transport system comprising:
    a fluid conduit;
    means for supplying a vacuum to said conduit to draw fluid into said conduit;
    means for detecting the partial filling of said fluid conduit;
    means responsive to said partial filling detecting means interrupting the flow of fluid so that some fluid is entrapped in said conduit; and
    means for applying gas under pressure to the trailing meniscus of said fluid for moving said fluid through said conduit.

11. A fluid transport system as defined in claim 10 wherein said means for detecting comprises plural means for detecting plural degrees of partial filling of said fluid conduit.

12. A fluid transport system as defined in claim 10 additionally comprising means responsive to said detecting means for interrupting said means for supplying a vacuum to said conduit.

13. A fluid transport system as defined in claim 10 additionally comprising:
    means for detecting the rate of flow of fluid within said conduit; and
    means responsive to said rate sensing means for delaying operation of said interrupting means in response to said partial filling detecting means.

14. The method for transporting fluid through an automated chemical analysis system comprising the steps of:
    forming a fluid slug having a lead meniscus and a trailing meniscus; and
    providing a vacuum force at the leading meniscus and a positive flowing air pressure upon the trailing meniscus so that the fluid is transported by a combination of push and pull forces so as to substantially minimize compressive forces upon said fluid.

15. A method of transporting fluid in an automated chemical analysis system, comprising:
    immersing an aspirating cannula into a container of liquid and inserting a dispensing cannula into a second container;
    applying a vacuum to a tube extending between the cannulas to aspirate a quantity of liquid through the aspirator cannula into the tube;
    injecting pressurized gas into the tube to isolate a quantity of the liquid in the tube between the gas and the dispenser; and
    blowing the isolated quantity of liquid through the dispenser cannula into the other container.

16. The method of claim 15 additionally including the step of metering said quantity of liquid as it passes through the tube.

17. The method of claim 16 wherein said injecting of said gas is initiated in response to said metering.

* * * * *